(12) United States Patent
Meijers et al.

(10) Patent No.: US 6,442,303 B1
(45) Date of Patent: Aug. 27, 2002

(54) METHOD AND DEVICE FOR GENERATING DISPLAY FRAMES FROM A SEQUENCE OF SOURCE FRAMES THROUGH SYNTHESIZING OR MORE INTERMEDIATE FRAMES EXCLUSIVELY FROM AN IMMEDIATELY PRECEDING SOURCE FRAME

(75) Inventors: Patrick F. P. Meijers, Eindhoven; Hendrik Dijkstra, Hilversum, both of (NL)

(73) Assignee: Koninklijke Philips Electronics N.V., New York, NY (US)

( * ) Notice: Subject to any disclaimer, the term of this patent is extended or adjusted under 35 U.S.C. 154(b) by 0 days.

(21) Appl. No.: 09/281,351

(22) Filed: Mar. 30, 1999

(30) Foreign Application Priority Data

Apr. 1, 1998 (EP) .............................. 98201034

(51) Int. Cl.$^7$ ................................. G06K 9/32
(52) U.S. Cl. ................. 382/300; 382/295; 345/606; 348/456
(58) Field of Search ................. 382/300, 309, 382/295, 236, 299; 348/412.1, 413.1, 415.1, 423.1, 538, 456, 476; 345/864, 474, 418, 640, 606, 427, 654, 156, 949

(56) References Cited

U.S. PATENT DOCUMENTS

| | | | | |
|---|---|---|---|---|
| 4,736,248 A | | 4/1988 | Rosebrock | .................. 358/140 |
| 5,550,543 A | * | 8/1996 | Chen et al. | .................... 341/94 |
| 5,604,856 A | * | 2/1997 | Guenter | ...................... 395/173 |
| 5,706,417 A | * | 1/1998 | Adelson | ...................... 395/129 |

OTHER PUBLICATIONS

"Efficient Prediction of Uncovered Background in Interframe Coding Using Spatial Extrapolation", A Kaup et al, Acoustics, Speech and Signal Processing 1994, ICASSP–94, 1994 IEEE International Conference on Apr. 19–22, 1994, ISBM–07803–1175–0.

* cited by examiner

Primary Examiner—Bhavesh Mehta
Assistant Examiner—Yosef Kassa
(74) Attorney, Agent, or Firm—Russell Gross

(57) ABSTRACT

For raising a frame rate, first a sequence of source frames is received at a source frame rate. For a pair of immediately adjacent source frames of this sequence, one or more intermediate frames are synthesized through a geometrical transform. In particular, each intermediate frame is based exclusively on an immediately preceding source frame. Display frames are selected from the sequence of the intermediate frames, and as the case may be, also from the source frames.

10 Claims, 2 Drawing Sheets

METHOD AND DEVICE FOR GENERATING DISPLAY FRAMES FROM A SEQUENCE OF SOURCE FRAMES THROUGH SYNTHESIZING OR MORE INTERMEDIATE FRAMES EXCLUSIVELY FROM AN IMMEDIATELY PRECEDING SOURCE FRAME

BACKGROUND OF THE INVENTION

The invention relates to a method as recited in the preamble of claim 1. U.S. Pat. No. 4,736,248 discloses how to generate display frames by interpolating between source frame pairs. The transformation algorithm is derived from point pairs that occur in both of two successive source frames. The interpolation uses the same transformation for other pixel pairs that occur in both of these source frames. Sometimes a particular source pixel is present in only one of the two source frames, so that only for that particular source pixel extrapolation must be effected. The reference intends to improve picture rendering in dynamic aerial survey.

A different field of use pertains to highly interactive computer games and similar multimedia environment types. Here, it is important to have a high frame rate, so that displayed motion will be as smooth as possible. In principle this will also allow minimal latency between user-initiated events and visual feedback connected therewith. Such is especially important for navigation control, like in flight simulation games. It has been suggested to raise the frame rate to a value comparable to the display refresh rate that may be 60–72 Hz. It has furthermore been found that Virtual Reality (VR) systems need low latency to protect a user person against motion sickness. However, the general use of interpolating according to the reference will introduce additional latency, because the various interpolation parameters will only be known after reception of the later source frame, even if among all of the pixels, certain display frame pixels will only depend on past source frame pixels.

SUMMARY TO THE INVENTION

In consequence, amongst other things, it is an object of the present invention to avoid the latency increase caused by overall interpolation. Now therefore, according to one of its aspects, the invention is characterized according to the characterizing part of claim 1. The Z-buffer is generated during the rendering of the source frames that is not part of the invention. The Z-buffer may be used to convert the 2-D-frames into 3-D space, so that changes in perspective as well as arbitrary 3-D camera rotations and translations may be implemented (Eq.8). These two transform types are the main causes for the changing of a scene.

A specific problem caused by extrapolating is that a scene part which was obscured in an earlier source frame may subsequently be uncovered in an extrapolated frame, because the obscuring object has moved in a transverse manner with respect to the obscured part. A solution is attained through lateral extrapolation from adjacent pixels that had not been subject to obscuring in the preceding source frame. The extrapolation may go along with or counter to the scanning direction. If the extrapolating operates on a background pattern or another entity with coarse granularity, the result is usually true or nearly true. On the other hand, the effect of a small item that would suddenly be uncovered from behind an obscuring object, will be ignored until arrival of the next source frame. Usually, the effect of this faking is allowable. Contrariwise to the above, restricting the extrapolation to a 2 D-affine transform would often create unreasonable distortions in the extrapolated frames, because a hitherto obscuring but moved part would now be extended a great deal. This problem is solved by making the extrapolation specifically dependent on the depth ($zv2$) expressed in the view coordinates of Eq. 12.

A display sequence may consist of the source frames together with intermediate frames. Alternatively, all or certain source frames may be left unused provided that the intermediate frames occur often enough. The inventive technology keeps display frame latency small. On the other hand, interpolating display frames may often increase latency to an unwanted extent.

The invention also relates to a frame-based device arranged for practising the recited method. Further advantageous aspects of the invention are recited in dependent claims.

The invention allows to calculate pixel displacements for producing intermediate frames between the frames generated by the 3-D rendering pipeline itself. The displacements may be calculated incrementally during scan conversion of the source frames, through consistently using results attained for an immediately adjacent pixel along the scan line. This requires for each next pixel only a low number of arithmetical calculations on the basis of pixels treated earlier.

The invention allows to use known camera motion with respect to a most recent source frame for producing instantaneous coherence between pixels of this source frame and pixels of an immediately following synthesized display frame according to Eq. 9.

BRIEF DESCRIPTION OF THE DRAWING

These and further aspects and advantages of the invention will be discussed more in detail hereinafter with reference to the disclosure of preferred embodiments, and in particular with reference to the appended Figures that show.

Tables 1A, 1B give various mathematical expressions.

DETAILED DESCRIPTION OF PREFERRED EMBODIMENTS

Figure 1:
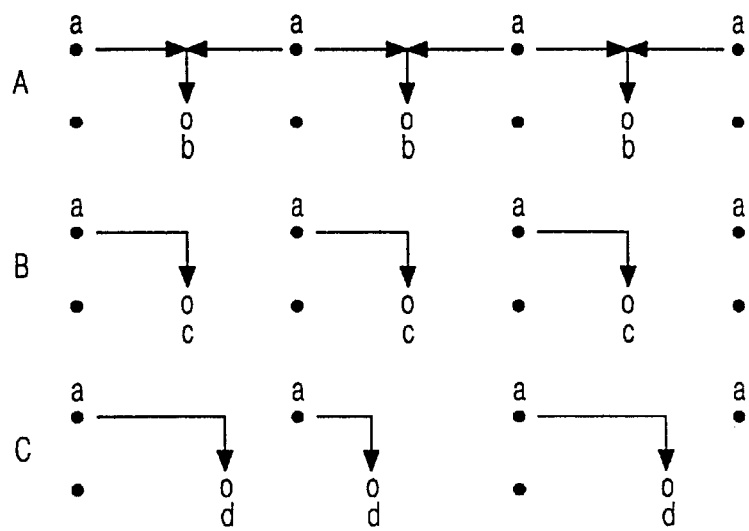
FIGS. 1A–1C, three display frame producing methods.

FIG. 1A shows a first method for raising the display frame rate. The top row has a time-sequence of uniformly spaced source frames "a". Between each pair of contiguous source frames an extra frame "b" is interpolated, as indicated by arrows. By using as display frames both the original a frames as well as the interpolated b frames, the rate is doubled. The latency is appreciable, because a b frame cannot be generated before the next a frame will have become available.

FIG. 1B shows a second method for raising the display frame rate. Between each pair of contiguous source frames an extra frame "c" is extrapolated being based exclusively on the last preceding a frame, which has been indicated by arrows. To use as display frames both the original a frames and the interpolated c frames will double the rate. Latency is less than in FIG. 1A, because a c frame may be generated immediately when the preceding a frame has become available.

FIG. 1C shows a third method for raising the display frame rate. Between each pair of immediately contiguous source frames an extra frame "d" is extrapolated exclusively based on the last preceding a frame, as indicated by arrows. In contradistinction to FIG. 1B, the delay between a source frame and its extrapolated d frame is nonuniform. Using half of the original a frames as well as the interpolated d frames will raise the rate by a factor of 50%. Latency is less than in FIG. 1A, because a d frame may be generated immediately when the preceding a frame has become available.

Figure 2:
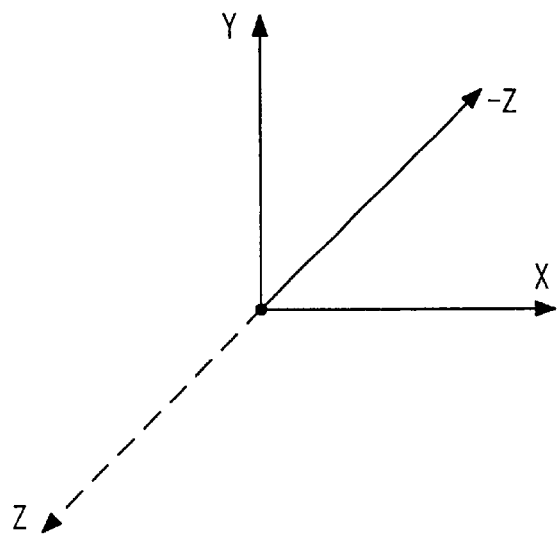
FIG. 2, a perspective overview of the generating.

FIG. 2 shows a perspective overview of the generating environment as based on an XYZ-coordinate system. Actual camera position is in the origin with the axis of view in the negative Z-direction; the camera has an "up"-direction along the positive Y-axis.

Figure 3:
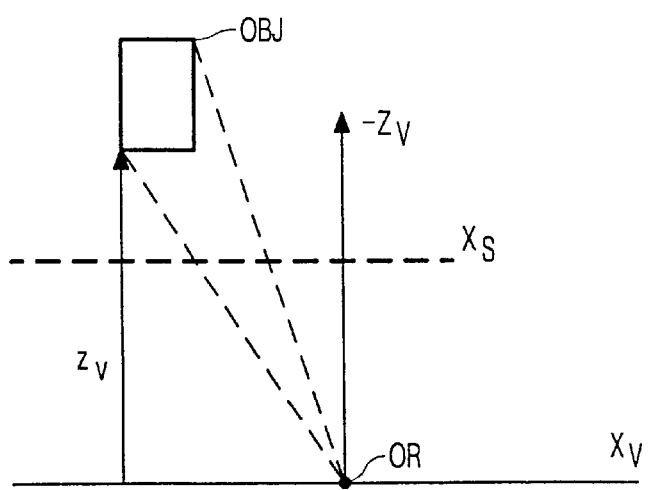
FIG. 3, relations between device and view coordinates.

FIG. 3 shows geometrical relations between device and view coordinates. The camera is again in the ORigin with its axis in the negative Z-direction. The horizontal axis in the Figure is the $X_{view}$-axis, the $Y_{view}$-axis is perpendicular to the plane of the drawing. The object OBJ has been shown projected for display on the screen at x-coordinate $X_S$. As shown, the FIG. has a perspective or central projection. Parallel projection is a feasible alternative.

Figure 4:
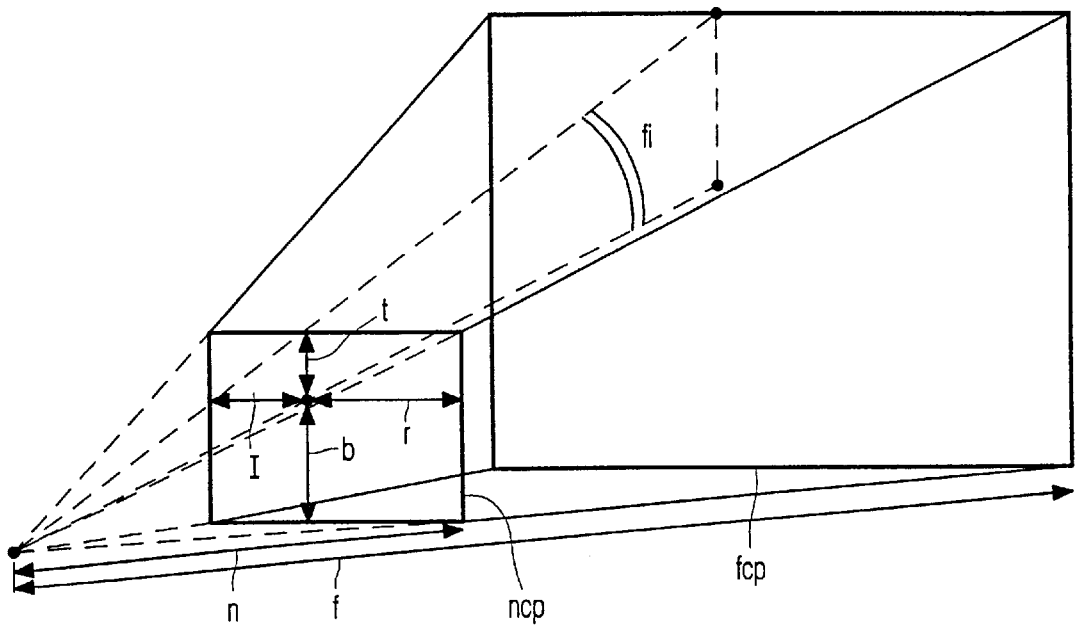
FIG. 4, the same as seen in perspective.

FIG. 4 shows this geometry in three-dimensional space. Far at left is the eye point of the camera position. The far clipping plane fcp at right and the near clipping plane ncp in the centre are perpendicular to the viewing axis, and together delimitate a viewing angle frustum. Similar clipping planes extend in the x- and y-directions. In the projection plane the signed distances top, bottom, left and right have been indicated. Further, the distances near and far between the origin and the projection plane and the object plane have been indicated. Also the height angle fi has been shown.

Figure 5:
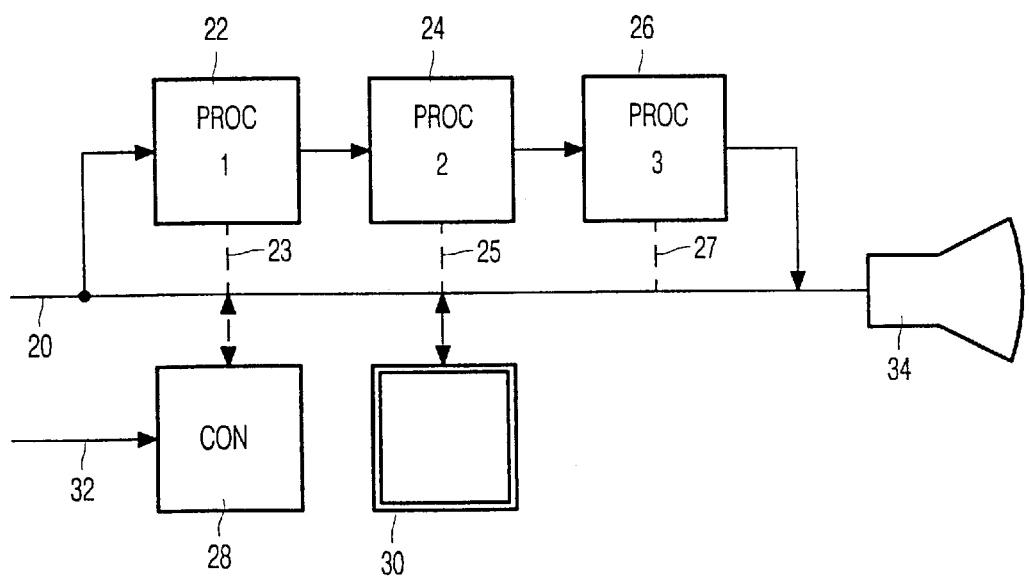
FIG. 5, a device for implementing the invention.

FIG. 5 shows a device for implementing the invention. The set-up is centred around communication bus 20 and main memory 30. The information to be processed is fetched from memory and sent to processing modules 22, 24, 26 that are connected in series to symbolize successive operations as will be listed in the tables hereinafter. The processing modules may be collectively mapped on shared hardware such as a CPU. After processing and possibly transient storage, the successive display frames attain subsystem 34 for display to a user. Overall control subsystem 28 is connected to the processing modules via control lines 23, 25, 27, that may lead via bus 20. In this manner, the data may in the CPU be translated into an image. Control subsystem 28 may receive control and data signals from various sources, such as manual or other inputs 32 from an actual user, external signals from other users in an interactive environment, or from cameras or further subsystems not shown for brevity.

MATHEMATICAL FORMULATION OF THE PROCEDURES

Generally, due to camera rotating, translating or zooming, the complete frame content may change with time. If the geometrical relations between the previous camera position and direction and the new camera position and direction are known, the coherence between the pixels of the old source frame and the new intermediate display frame to be extrapolated will also be known. Tables 1A, 1B give various mathematical expressions, including relations between various coordinates, such as view space coordinates, projection coordinates, normalized device coordinates and screen-space coordinates.

First, equation (1) is the perspective projection matrix. It defines the various quantities near, far, top, bottom, left and right plane positions of the viewing frustrum shown in FIG. 4. Equations (2) define a Symmetrical Viewing Frustrum; an unsymmetrical frustrum may be used as well. Next, equations (3) define the use of the height angle fi and aspect ratio a to further specify the viewing frustrum. Equation (4) expresses the relations between the projection coordinates (postscripted p) and homogeneous view coordinates (postscripted v) via the projection matrix P. Other projections such as orthogonal are also feasible. Equation (5) gives normalized device coordinates (subscripted n). Finally, equation (6) gives the screen coordinates (postscripted s). Straightforward insertion derives the ultimate relations between screen coordinates and view coordinates as given in (7). Using {xv1, yv1, zv1} and {xs1, ys1} as the coordinates in the source frame, then {xv1, yv1} can be written according to equation (8).

Matrix transformation of the view coordinates due to camera motion and/or object changes is given in (9). Equation (10) gives the coordinates in the extrapolated frame, so that the expressions for (xs2, ys2) can be straightforwardly found as given in (11). Further, (12) is the expression for zv2. Now, fz is linearly related to the screen coordinates xs1 and ys1, and fz may be incrementally computed during scan conversion by adding a constant delta that is the time derivative of the movement. Hence calculating zv requires the following:

add delta to fz multiply by zv1 add to m23

Further, xs2 and ys2 can be written according to expression (13). Also, fx and fy are linearly related to the screen coordinates xs1 and ys1, so that they may also be incrementally computed by adding a constant delta. Therefore, the incremental calculation of xs2 and ys2 requires the following, in addition to calculating zx2:

calculate zv2 reciprocal (i.e. divide 1 by zv2)

add delta to fx and add delta to fy multiply both these results by zv1 add the two products to h*k*m03/2 and h*k*m13/2 respectively multiply both results by reciprocal zv2 add to w/2 and h/2, respectively.

The above adds up to eight additions, five multiplications and one division.

Furthermore, many game applications will present one or more objects on the screen, which may observe a dynamic behaviour that is independent from camera movement. This behaviour may be represented by a relative transform with respect to the camera for each such object that will usually be represented as one rigid body, or as a composite made up of various interconnected rigid bodies. Object movement can be realized by multiplying the camera transformation matrix $M_{cam}$ by the rigid-body transformation $M_{obj}$ for all pixels of the object in question. Thereupon, the displacement functions described earlier will calculate the motion vectors of the various pixels. Each pixel should have an identifier of the object to which it belongs, which identification should furthermore point to the final transformation matrix $M=M_{cam} \cdot M_{obj}$ of that object in the view-space of the most recently rendered source frame. This can be effected by introducing an extra description plane which contains object or matrix pointers. Usually the number of such rigid bodies in any scene will be less than 256, so one extra byte per pixel should be sufficient. The object plane can be efficiently compressed with runlength encoding RLE as usually the plane will contain large areas of uniform-valued pixels that belong to a single rigid body.

TABLES

Define view coordinaes $xv, yv, zv$ (0)

Projection Matrix:

$$P = \begin{pmatrix} \frac{n2}{r-1} & 0 & \frac{1+r}{r-1} & 0 \\ 0 & \frac{2n}{t-b} & \frac{b+t}{t-b} & 0 \\ 0 & 0 & -\frac{f+n}{f-n} & -\frac{2fn}{f-n} \\ 0 & 0 & -1 & 0 \end{pmatrix};$$
(1)

Symetrical Viewing Frustrum given by:

$b=-t;$
$l=-r$ (2)

Use Angle fi and aspect ratio a to specify frustrum: $k=1/\text{Tan}[2 \text{ fi}]$ $a=w/h;$
$t=n/k;$ (3)
$r=ta;$ Projection Coordinates:

$\{xp, yp, zp, wp\} = P \cdot \{xv, yv, zv, 1\};$ (4)

Normalised Device Coordinates:

$\{xn, yn\} = \{xp, yp\}/wp;$ (5)

Screen coordinates:

$\{xs, ys\} = \{½w(xn+1); ½h(yn+1)\};$ (6)

Which substitution is equal to:

$$\left\{ \frac{w}{2} - \frac{h\ k\ xv}{2\ zv}, \frac{h}{2} - \frac{h\ k\ yv}{2\ zv} \right\}$$
(7)

So, using $\{xv1, yv1, zv1\}$ and $\{xs1, ys1\}$ as the coordinates in the source frame, then $\{xv1, yv1\}$ can be written as:

$$\{xv1, yv1\} = \left\{ \frac{(w-2xs1)\ zv1}{hk}, \frac{(h-2ys1)\ zv1}{hk} \right\}$$
(8)

Matrix Transformation of the view coordinates due to camera and/or object changes:

$$M = \begin{pmatrix} m00 & m01 & m02 & m03 \\ m10 & m11 & m12 & m13 \\ m20 & m21 & m22 & m23 \\ 0 & 0 & 0 & 1 \end{pmatrix};$$
(9)

Coordinates in the intermediate frame:

$\{xv2, yv2, zv2, wv2\} = M \cdot \{xv1, yv1, zv1, 1\};$ (10)

So:

$$\{xs2, ys2\} = \left\{ \frac{w}{2} - \frac{h\ k\ xv2}{2\ zv2}, \frac{h}{2} - \frac{h\ k\ yv2}{2\ zv2} \right\} =$$

$$\left\{ \frac{1}{2}w\left(1 - \frac{hk\left(m03 + m02zv1 + \frac{m00(w-2xs1)zv1}{hk} + \frac{m01(h-2ys1)zv1}{hk}\right)}{w\ zv2}\right), \right.$$

$$\left. \frac{1}{2}h\left(1 - \frac{k\left(m13 + m12zv1 + \frac{m10(w-2xs1)zv1}{hk} + \frac{m11(h-2ys1)zv1}{hk}\right)}{zv2}\right) \right\}$$
(11)

and zv2 is equal to:

$$zv2 =$$
$$m23 + \left(m22 + \frac{m20(w-2xs1)}{hk} + \frac{m21(h-2ys1)}{hk}\right)zv1 = m23 + fz\ zv1$$
(12)

fz is linearly related to the screen coordinates xc1 and ys1, so that fz can be incrementally computed by adding a constant delta during scan conversion. Hence the incremental computation of zv2 requires:

add delta to fz
multiply by zv1
add to m23 xs2 and ys2 can be rewritten as:

$$\left\{\frac{w}{2} - \frac{hkm03/2 + (hkm02 + m00(w - 2xs1) + m01(h - 2ys1))zv1/2}{zv2},\right.$$
$$\left.\frac{h}{2} - \frac{hkm13/2 + (hkm12 + m10(w - 2xs1) + m11(h - 2ys1))zv1/2}{zv2}\right\} = \quad (13)$$
$$\left\{\frac{w}{2} - \frac{hkm03/2 + fx\, zv1}{zv2}, \frac{h}{2} - \frac{hkm13/2 + fyvz1}{zv2}\right\}$$

Also fx and fy are linearly related to the screen coordinates xs1 and ys1, such that they can be incrementally computed by adding a constant delta. So the incremental computation of xs2 and ys2 requires (additionally to the compution of xv2):

calculate zv2 reciprocal (divide 1 by zv2)
add delta to fx and add delta to fy
multiply both results by zv1
add to h k m03/2 and h k m13/2 respectively
multiply both results by reciprocal zv2
add to w/2 and h/2 respectively.

This sums up to: 1 div, 5 mults, and 8 adds!

What is claimed is:

1. A method for displaying a first sequence of display frames, comprising the steps of:

receiving a second sequence of source frames at a source frame rate, and synthesizing on the basis of said second sequence for a pair of immediately adjacent source frames one or more intermediate frames through using a geometrical transformation method, and being characterized in that each intermediate frame is based exclusively on an immediately preceding source frame, through extrapolation from camera transformations, for on the basis of a sequence of said intermediate frames, also on the basis of said source frames selecting said display frames at a raised display frame rate with respect to said source frame rate.

2. A method as claimed in claim 1, whilst using known camera motion with respect to a most recent source frame for producing instantaneous coherence between pixels of the latter source frame and pixels of an immediately following synthesized display frame.

3. A method as claimed in claim 1, and based on in-frame extrapolation that operates exclusively along with or counter to display lines scan motion.

4. A method as claimed in claim 1, while furthermore displaying a solid body in an extrapolated frame according to a transformation matrix.

5. A method as claimed in claim 1, whilst ignoring an uncovered item that relates to no continually visible pixel, until arrival of a next source frame that has such item as rendered.

6. A frame-based device arranged for displaying a first sequence of display frames, and comprising:

receiving means for receiving a second sequence of source frames at a source frame rate, and synthesizing means for synthesizing on the basis of said second sequence for a pair of immediately adjacent source frames one or more intermediate frames through using a geometrical transformation method, characterized in that said synthesizing means are arranged for basing each intermediate frame exclusively on an immediately preceding source frame, through extrapolation from camera transformations, and outputting means fed by said synthesizing means for on the basis of a sequence of said intermediate frames, also on the basis of said source frames outputting said display frames at a raised display frame rate with respect to said source frame rate.

7. A device as claimed in claim 6, wherein said synthesizing means are arranged for receiving camera motion information with respect to a most recent source frame for producing instantaneous coherence between pixels of the latter source frame and pixels of an immediately following synthesized display frame.

8. A device as claimed in claim 6, said synthesizing means having in-frame extrapolation means that operate exclusively along with or counter to display lines scan motion.

9. A device as claimed in claim 6, and having matrix multiplication means for displaying a solid body in an extrapolated frame according to a transformation matrix.

10. A device as claimed in claim 6, and having ignoring means for ignoring an uncovered item that relates to no continually visible pixel, until arrival of a next source frame that has such item as rendered.

* * * * *